(12) United States Patent
Byun (10) Patent No.: US 11,537,483 B2
(45) Date of Patent: Dec. 27, 2022

(54) CONTROLLER FOR MANAGING SUPERBLOCKS AND OPERATION METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 351 days.

(21) Appl. No.: 16/837,794

(22) Filed: Apr. 1, 2020

(65) Prior Publication Data
US 2021/0042201 A1  Feb. 11, 2021

(30) Foreign Application Priority Data
Aug. 8, 2019  (KR) .................. 10-2019-0096793

(51) Int. Cl.
G06F 11/36 (2006.01)
G06F 11/20 (2006.01)
G06F 3/06 (2006.01)

(52) U.S. Cl.
CPC ........ *G06F 11/2094* (2013.01); *G06F 3/0619* (2013.01); *G06F 3/0652* (2013.01); *G06F 3/0659* (2013.01); *G06F 3/0679* (2013.01); G06F 2201/82 (2013.01)

(58) Field of Classification Search
CPC .... G06F 11/20; G06F 11/2094; G06F 3/0619; G06F 3/0652
See application file for complete search history.

(56) References Cited

U.S. PATENT DOCUMENTS

| | | | | |
|---|---|---|---|---|
| 4,281,398 A | * | 7/1981 | McKenny | G11C 29/80 365/210.11 |
| 5,933,845 A | * | 8/1999 | Kopp | G06F 12/0246 711/171 |
| 8,417,987 B1 | * | 4/2013 | Goel | G06F 11/1076 714/6.22 |
| 8,447,920 B1 | * | 5/2013 | Syu | G06F 12/0246 365/230.01 |
| 9,842,024 B1 | * | 12/2017 | David | G06F 3/065 |
| 10,101,942 B1 | * | 10/2018 | Parker | G06F 12/0246 |
| 2011/0022778 A1 | * | 1/2011 | Schibilla | G06F 12/0246 711/170 |
| 2014/0129874 A1 | * | 5/2014 | Zaltsman | G06F 11/108 714/764 |
| 2014/0359382 A1 | * | 12/2014 | Choi | G06F 12/0246 714/710 |
| 2016/0307645 A1 | * | 10/2016 | Kim | G11C 29/76 |
| 2018/0165172 A1 | * | 6/2018 | Lin | G06F 11/30 |

(Continued)

FOREIGN PATENT DOCUMENTS

KR  10-2006-0120231  11/2006
KR  10-2018-0121794  11/2018

*Primary Examiner* — Kamini B Patel
(74) *Attorney, Agent, or Firm* — IP & T Group LLP (57) ABSTRACT

A method for operating a controller that controls a memory device includes: replacing a bad block of a superblock with a replacement block to form a reproduced superblock; controlling the memory device to perform a program operation on the reproduced superblock according to an interleaving scheme; moving data stored in the replacement block to a pseudo-replacement block when the program operation on the reproduced superblock is completed; and releasing the replacement block from the reproduced superblock.

15 Claims, 8 Drawing Sheets

(56) References Cited

U.S. PATENT DOCUMENTS

| | | | |
|---|---|---|---|
| 2020/0073573 A1* | 3/2020 | Park | G11C 16/26 |
| 2020/0117559 A1* | 4/2020 | Park | G06F 3/061 |
| 2020/0150867 A1* | 5/2020 | Byun | G06F 3/0679 |
| 2020/0183851 A1* | 6/2020 | Um | G06F 11/076 |
| 2020/0192796 A1* | 6/2020 | Lee | G11C 29/886 |
| 2020/0293213 A1* | 9/2020 | Haridas | G06F 3/067 |
| 2021/0011842 A1* | 1/2021 | Lee | G11C 16/10 |

* cited by examiner

CONTROLLER FOR MANAGING SUPERBLOCKS AND OPERATION METHOD THEREOF

CROSS-REFERENCE TO RELATED APPLICATION

The present application claims priority on Korean Patent Application No. 10-2019-0096793, filed on Aug. 8, 2019, which is incorporated herein by reference in its entirety.

BACKGROUND

1. Field

Various embodiments of the present invention relate to a controller that controls a memory device and manages superblocks to improve performance of a program operation.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a controller that may improve the performance of a program operation by reproducing a superblock in a memory device with a fewer replacement blocks, and a method for operating the controller.

In accordance with an embodiment of the present invention, a method for operating a controller that controls a memory device includes: replacing a bad block of a superblock with a replacement block to form a reproduced superblock; controlling the memory device to perform a program operation on the reproduced superblock according to an interleaving scheme; moving data stored in the reserved bock to a pseudo-replacement block when the program operation on the reproduced superblock is completed; and releasing the replacement block from the reproduced superblock.

In accordance with another embodiment of the present invention, a controller for controlling a memory device includes: a superblock manager suitable for replacing a bad block of a superblock with a replacement block to form a reproduced superblock; a command scheduler suitable for controlling the memory device to perform a program operation on the reproduced superblock according to an interleaving scheme; and a background operation controller suitable for moving data stored in the replacement block to a pseudo-replacement block when the program operation on the reproduced superblock is completed, wherein the superblock manager releases the replacement block from the reproduced superblock.

In accordance with another embodiment of the present invention, a method of controlling a memory device including first and second normal blocks and a group having a bad block and other blocks, the method includes: controlling the memory device to store, according to an interleaving scheme, data into the other blocks and the first normal block instead of the bad block; and controlling the memory device to move the data from the first normal block to the second normal block, wherein the other blocks and the bad block are of different planes within the memory device, wherein the bad block and the first normal block belong to a same plane, and wherein the first and second normal blocks belong to different planes.

BRIEF DESCRIPTION OF THE DRAWINGS

FIGS. 4 to 5D illustrate an operation of the memory system in accordance with an embodiment of the present invention.

DETAILED DESCRIPTION

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

Throughout the specification, reference to "an embodiment," "another embodiment" or the like is not necessarily to only one embodiment, and different references to any such phrase are not necessarily to the same embodiment(s). Also, use of an indefinite article, i.e., "a" or "an," in connection with an element or operation is intended to mean one or more, unless it is stated or the context clearly indicates that only one is intended. Similarly, terms such as comprising," "including" and the like are used in the open-ended sense, meaning that unstated items are not excluded. With that in mind, embodiments of the present invention are described below in more detail with reference to the drawings.

Figure 1:
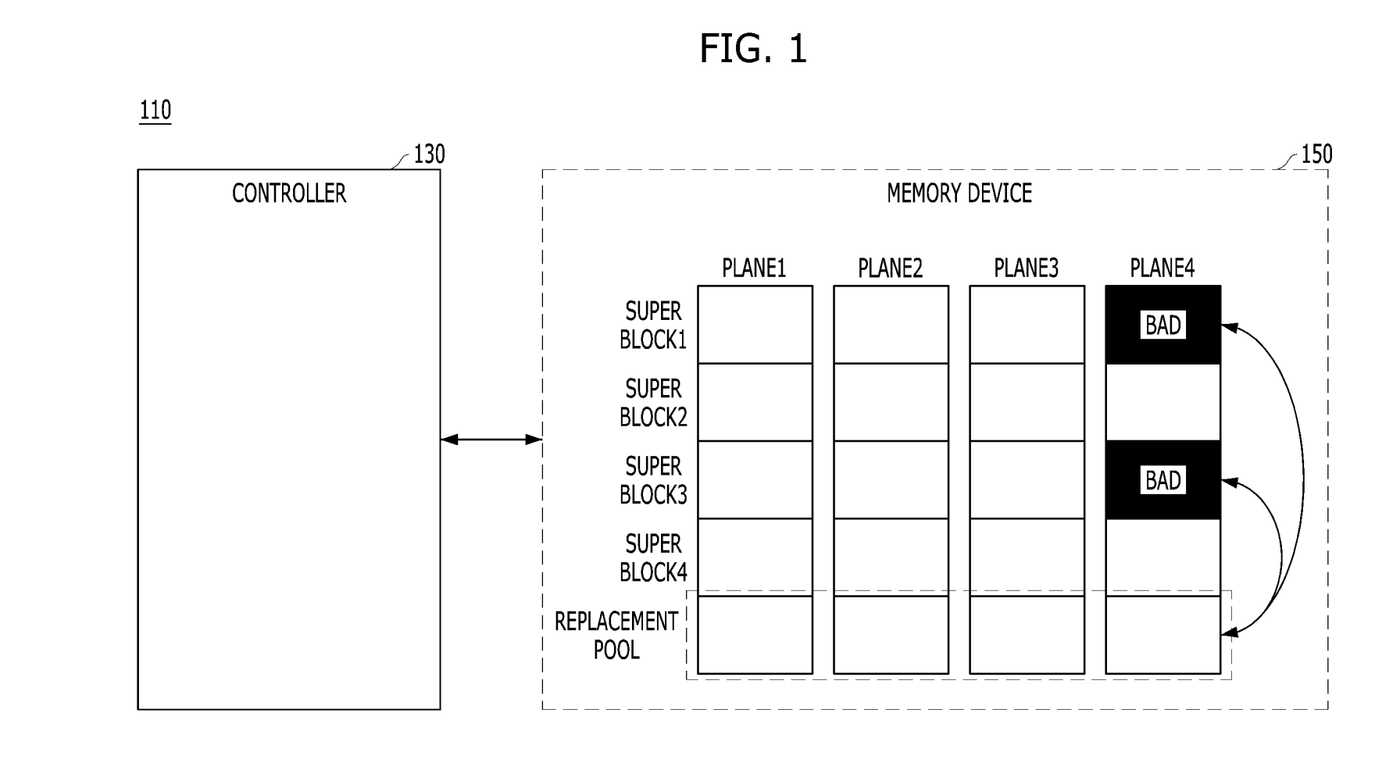
FIG. 1 is a block diagram schematically illustrating a memory system in accordance with an embodiment of the present invention.

FIG. 1 is a diagram schematically illustrating an example of a memory system 110 in accordance with an embodiment.

The memory system 110 may operate to store data for the host 102 in response to a request of the host. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick.

The MMC may include an embedded MMC (eMMC), reduced size MMC (RS-MMC) and micro-MMC, and the. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In another embodiment, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

In other words, the controller 130 may control the memory device 150 in response to a request received from the host 102. The controller 130 may perform a foreground operation as the command operation corresponding to the request received from the host 102. The controller 130 may control a read, program, erase operation of a memory device.

The memory device 150 may include a flash memory device. The flash memory may store data in a memory cell array including memory cell transistors. The flash memory may have a hierarchical structure of memory die, plane, memory block and page.

One memory die may receive one command at one time. The flash memory may include a plurality of memory dies. One memory die may include a plurality of planes, and the plurality of planes may process the commands received by the memory die in parallel. Each plane may include a plurality of memory blocks. A memory die-plane-memory block hierarchical structure is described in detail with reference to FIG. 2.

The memory block may be the minimum unit of an erase operation. One memory block may include a plurality of pages. Each page may include a plurality of memory cells and may be the minimum unit of a write operation. A memory block-page-memory cell hierarchical structure is described in detail with reference to FIG. 3.

Meanwhile, the plurality of planes may individually operate in parallel. The controller 130 may provide commands to the respective planes according to an interleaving scheme. The planes of the memory device 150 may simultaneously perform an operation, such as a read operation, a program operation, or an erase operation, in response to the command. The controller 130 may form a superblock by logically grouping memory blocks in which data may be programmed in parallel.

FIG. 1 illustrates a memory device 150 including first to fourth planes PLANE1 to PLANE4. In the example of FIG. 1, the controller 130 may form first to fourth superblocks SUPERBLOCK1 to SUPERBLOCK4 by logically grouping blocks in the first to fourth planes of the same offset.

SUPERBLOCK1 may include a bad block, which may be a defective memory block that is not capable of storing data normally. A bad block may occur due to a defect during the manufacturing stage of the memory device 150, or it may occur during use of the memory device 150. The performance of a program operation in a superblock according to the interleaving scheme may be lower when the superblock includes a bad block compared to when the superblock is free of bad blocks. This is because when a program operation is performed in SUPERBLOCK1, for example, the program operation is performed only in three planes and not in PLANE4, which contains the bad block.

The controller 130 may form a reproduced superblock by replacing the bad block with a replacement block (i.e., a reserved block) that belongs to the same plane as the bad block in order to improve the program operation performance of the superblock including the bad block. The memory device 150 may include a replacement block pool REPLACEMENT_POOL including replacement blocks of each plane. The controller 130 may form the first reproduced superblock by replacing the bad block of the fourth plane of SUPERBLOCK1 with a replacement block of the fourth plane of the REPLACEMENT_POOL. The controller 130 may store information of blocks forming the first reproduced superblock in an internal memory.

In the example of FIG. 1, the third superblock SUPERBLOCK3 may also include a bad block. The controller 130 may replace that bad block with a replacement block of PLANE4 to which the bad block belongs in order to form a third reproduced superblock.

According to an embodiment of the present invention, when the controller 130 uses a superblock including a bad block, the controller may form a reproduced superblock temporarily. For example, referring to FIG. 1, the controller 130 may form the first reproduced superblock by replacing the bad block of SUPERBLOCK1 with a replacement block. The controller 130 may perform a program operation on the first reproduced superblock according to the interleaving scheme. When the program operation of the first reproduced superblock is completed, the controller 130 may move the data from the replacement block into one or more pseudo-replacement block. The pseudo-replacement block indicates a memory block to store the data moved from the replacement block. In this specification, the pseudo-replacement block may store the data moved from the replacement block. The controller 130 may release the replacement block from the first reproduced superblock. The released replacement block may be used to form the third reproduced superblock by replacing the bad block of SUPERBLOCK3.

According to an embodiment of the present invention, the controller 130 may perform a program operation on a reproduced superblock, which is temporarily formed from a superblock having a bad block by replacing the bad block with a replacement block, according to the interleaving scheme. After completion of the program operation on the reproduced superblock, data may be moved from the replacement block to the pseudo-replacement block and the replacement block may be released from the reproduced superblock and returned to the replacement block pool 154.

If the reproduced superblock is temporally formed, a replacement block may replace another bad block after one bad block is replaced. Therefore, by using fewer replacement blocks than bad blocks in the memory device 150, the controller 130 may program data in an interleaving scheme to all the super blocks including the bad blocks.

The operation of moving the data from the replacement block into the pseudo-replacement block may be performed by the controller 130 as a background operation. Thus, the controller 130 may provide users with improved program operation performance by using a smaller number of replacement blocks.

Figure 2:
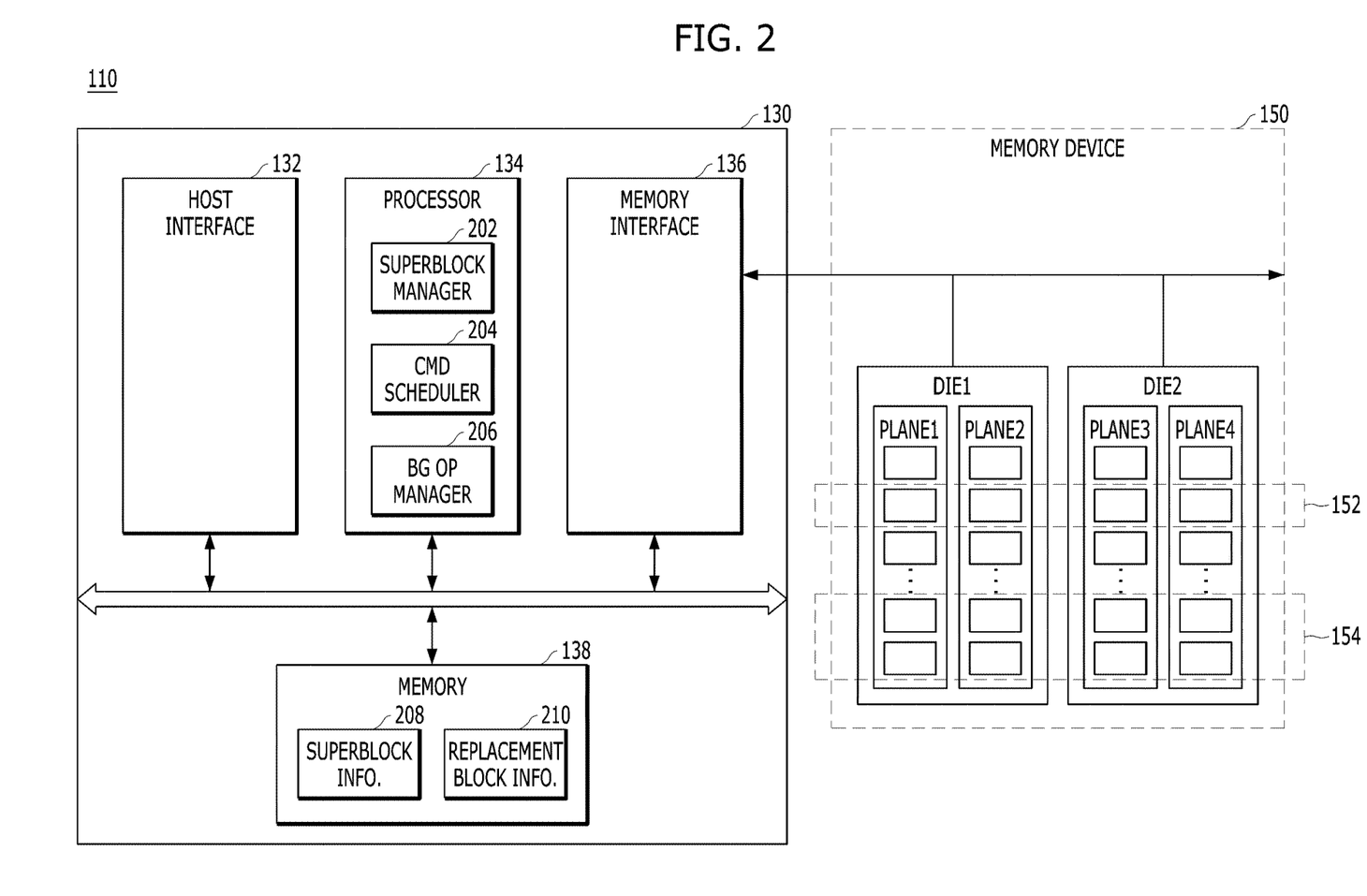
FIG. 2 is a block diagram illustrating an example of a memory system according to an embodiment of the present invention.

FIG. 2 is a block diagram illustrating an example of the memory system 110 according to an embodiment of the present invention. A controller 130 and a memory device 150 of the memory system 110 shown in FIG. 2 may correspond to the controller 130 and the memory device 150 described with reference to FIG. 1.

The memory device 150 may be a non-volatile memory device and may maintain stored data even when power is not supplied. The memory device 150 may store data provided from a host through a write operation and provide the host with the data stored in the memory device 150 through a read operation.

According to an embodiment of the present invention, the memory device 150 may be a non-volatile memory, such as a flash memory, for example, a NAND flash memory. However, in another embodiment, the memory device 150 may be realized as any of a Phase Change Random Access Memory (PCRAM), a resistive Random Access Memory (ReRAM), a ferroelectric Random Access Memory (FRAM), and a Spin Transfer Torque Magnetic Random Access Memory (STT-MRAM).

The memory device 150 may include a plurality of memory dies, e.g., DIE1 and DIE2. In the example of FIG. 2, DIE1 and DIE2 may be coupled to the controller 130 through a channel CH. Each of DIE1 and DIE2 may include one or more planes. The memory die may receive a command from the controller 130 through the channel to which that memory die is coupled, and transfer the command to the planes in that memory die. The present invention is not limited to the specific configuration of the memory device 150 shown FIG. 2. In particular, the memory device 150 may include any suitable number of memory dies and number of planes per die. Any suitable channel configuration may be used as well.

The controller 130 may provide only one command through one channel at a time. However, the planes that sequentially receive commands may operate simultaneously. According to the interleaving scheme, the controller 130 may control PLANE1 to PLANE4 to operate in parallel to improve the performance of the memory device 150.

The controller 130 may form a superblock 152 by logically grouping memory blocks that may be programmed in parallel.

The memory device 150 may replace a bad block within a superblock with a replacement block in order to maximize the program performance of that superblock.

In this embodiment of the present invention, the controller 130 may select a memory block among the normal blocks, which belong to the same plane as the bad block, as the replacement block.

In an embodiment of the present invention, the controller 130 may form a replacement block pool 154, from which to select a reserve block, among the normal blocks in the memory device 150. FIG. 2 illustrates the replacement block pool 154, which may include a set number of replacement blocks for each plane. The replacement blocks fin the replacement block pool 154 may be changed. For example, a replacement block that becomes a bad block may be removed from the replacement block pool 154 and replaced with another replacement block to maintain the number of replacement blocks.

The controller 130 may include a host interface (I/F) 132, a processor 134, a memory I/F 136, and a memory 138.

The host I/F 132 may be configured to process a request and data from the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and/or integrated drive electronics (IDE).

The host I/F 132 may be driven through firmware referred to as a host interface layer (HIL) in order to exchange data with the host.

The processor 134 may control overall operation of the memory system 110. The processor 134 may drive firmware to control overall operation of the memory system 110. The firmware may be referred to as flash translation layer (FTL). Also, the processor 134 may be realized as a microprocessor or a central processing unit (CPU).

For example, the controller 130 may perform an operation requested by the host 102 through the processor 134. The controller 130 may perform a foreground operation as the command operation corresponding to the request received from the host 102. For example, the request received from the host may include read request and write request.

The processor 134 may drive a superblock manager 202, a command scheduler 204, and a background operation controller 206. For example, the superblock manager 202, the command scheduler 204, and the background operation controller 206 may be included in a flash transformation layer which is driven by the processor 134.

The superblock manager 202 may form a reproduced superblock by replacing a bad block in a superblock with a replacement block in order to maximize the program performance of the superblock. The superblock manager 202 may release the replacement block from the reproduced superblock when a program operation of the reproduced superblock is completed and move the data from the replacement block into a pseudo-replacement block. For example, in releasing the replacement block, the superblock manager 202 may return the replacement block to the replacement block pool 154. After releasing the replacement block, the reproduced superblock may no longer exist.

The command scheduler 204 may transform a request that includes a logical address into a command that includes a physical address. The command scheduler 204 may assign the physical address for the logical address provided along with the request by referring to a mapping table (not shown) stored in the controller 130. The command scheduler 204 may update the mapping information between the logical address and the physical address in the mapping table.

The command scheduler 204 may schedule a plurality of commands corresponding to a request so that the memory device 150 operates according to the interleaving scheme. For example, the command scheduler 204 may respectively assign the physical addresses of the planes for the logical address provided along with the request such that the operations corresponding to the commands may be performed in the planes.

For example, the command scheduler 204 may map consecutive logical addresses corresponding to a write request to the physical addresses of the planes PLANE1 to PLANE4. The command scheduler 204 may provide program commands for the planes PLANE1 to PLANE4 through a channel coupled to those planes.

The background operation controller 206 may perform a background operation on the memory device 150. For example, a background operation on the memory device 150 may include a garbage collection (GC) operation, a wear leveling (WL) operation, a map flush operation, and/or a bad block management operation. The background operation controller 206 may control the memory device 150 to perform a background operation of moving the data from a replacement block to a pseudo-replacement block.

The memory I/F 136 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 136 may generate a control signal for the memory device 150 and process data to be provided to the memory device 150 under the control of the processor 134. The memory I/F 136 may work as an interface (e.g., a NAND flash interface) for processing a command and data between the controller 130 and the memory device 150. Specifically, the memory I/F 136 may support data transfer between the controller 130 and the memory device 150.

The memory I/F 136 may be driven through firmware referred to as a flash interface layer (FIL) in order to exchange data with the memory device 150.

The memory 138 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 138 may store data for the controller 130 and the memory device 150 to perform these operations. As an example, the memory 138 may store a mapping table.

The memory 138 may be embodied by a volatile memory. For example, the memory 138 may be embodied by static random access memory (SRAM) or dynamic random access memory (DRAM).

The memory 138 may be disposed within or externally to the controller 130. FIG. 1 exemplifies the memory 138 disposed within the controller 130. In another embodiment, the memory 138 may be embodied by an external volatile memory having a memory interface transferring data between the memory 138 and the controller 130.

The memory 138 may include a buffer, a cache, a queue and the like to store data for performing an operation such as a write operation and a read operation between the host and the memory device 150. The memory 138 may include a block management table 208.

The memory 138 may store superblock information 208 and replacement block information 210.

The superblock information 208 may include information representing whether each of the memory blocks forming a superblock is a normal block or a bad block.

The replacement block information 210 may include information representing which bad block each replacement block replaces.

The superblock manager 202 may determine whether or not a superblock to be used includes a bad block based on the superblock information 208. The superblock manager 202 may search for an available replacement block of the same plane as the bad block by referring to the replacement block information 210. According to an embodiment of the present invention, the superblock manager 202 may search for the available replacement block in all memory blocks of the same plane or search for the available replacement block in the replacement block pool 154. The superblock manager 202 may replace the bad block with an available replacement block identified in the search.

Figure 3:
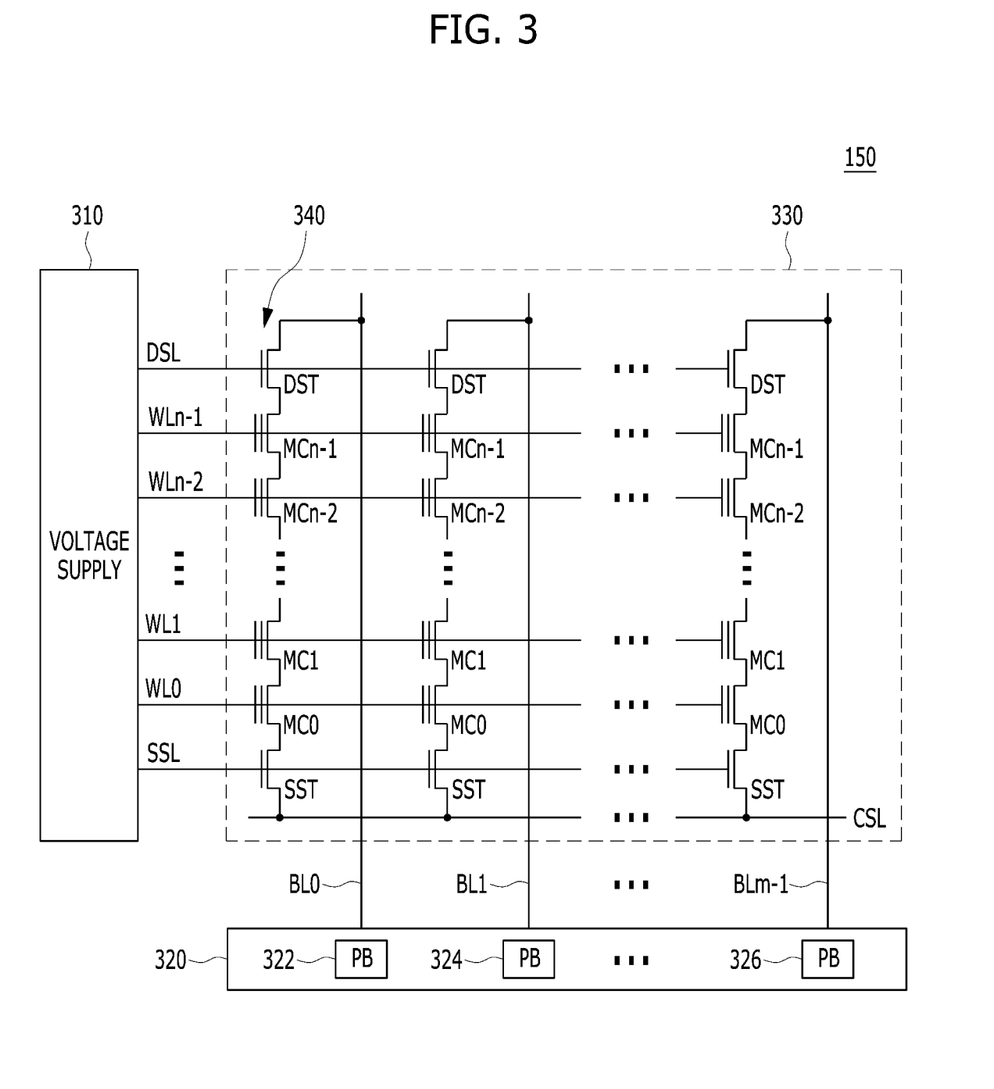
FIG. 3 is a block diagram illustrating a memory cell array circuit included in a memory device.

FIG. 3 is a circuit diagram illustrating an exemplary configuration of a memory cell array of a memory block in the memory device 150.

Referring to FIG. 3, a memory block 330, which may correspond to any of the plurality of memory blocks 152 to 156 included in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells or memory cell transistors MC0 to MCn−1 may be coupled in series. In an embodiment, each of the memory cells MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
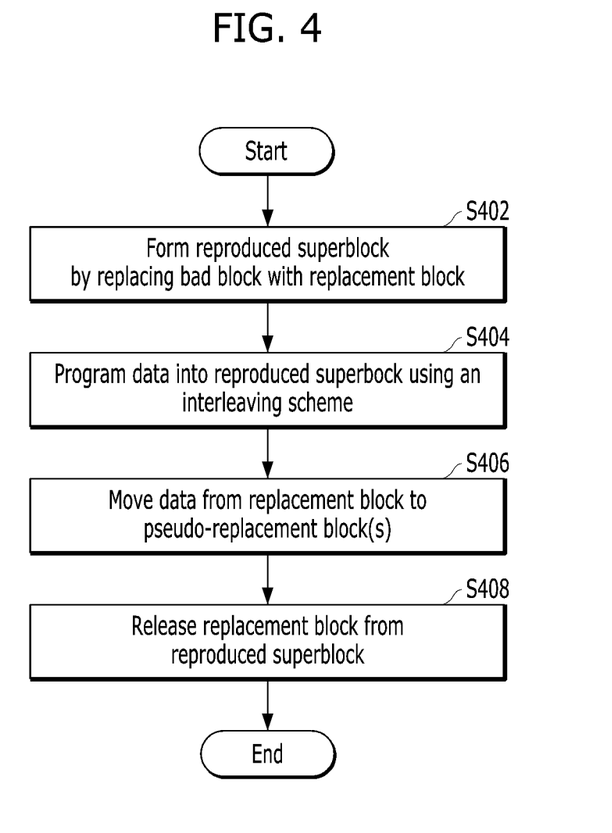
Figure 5A:
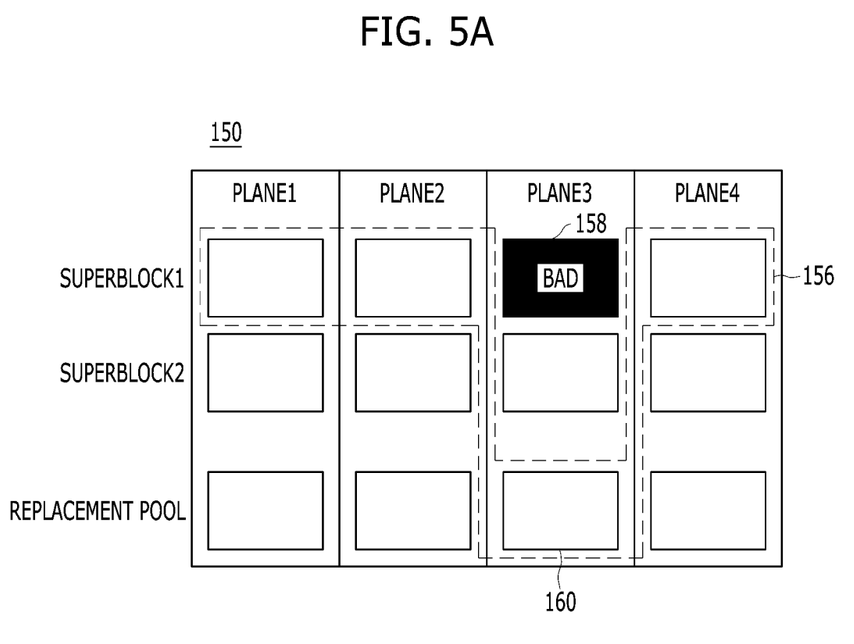
Figure 5B:
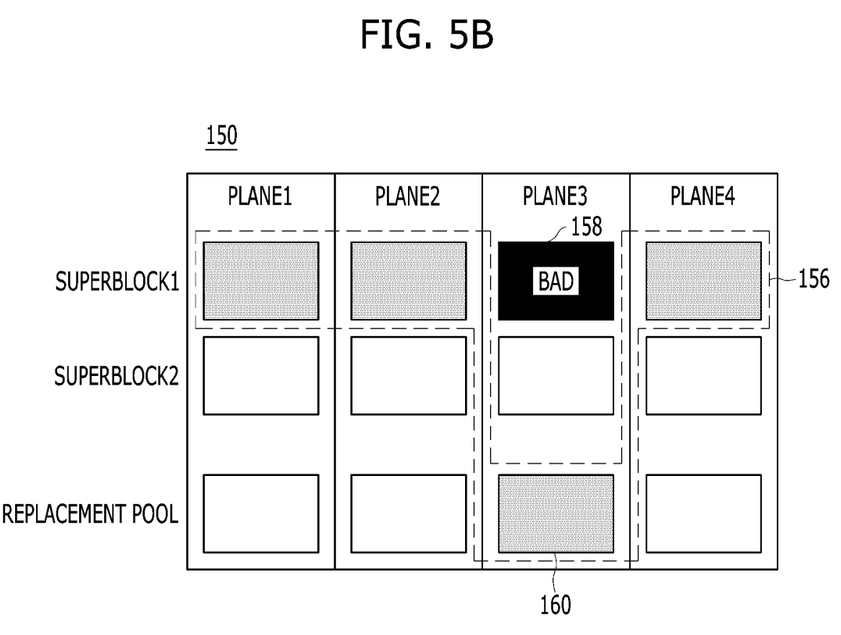
Figure 5C:
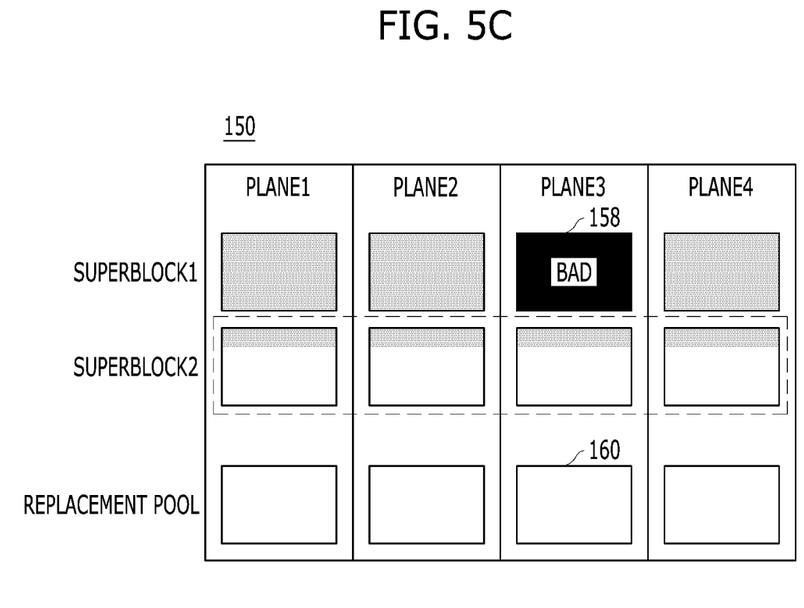
Figure 5D:
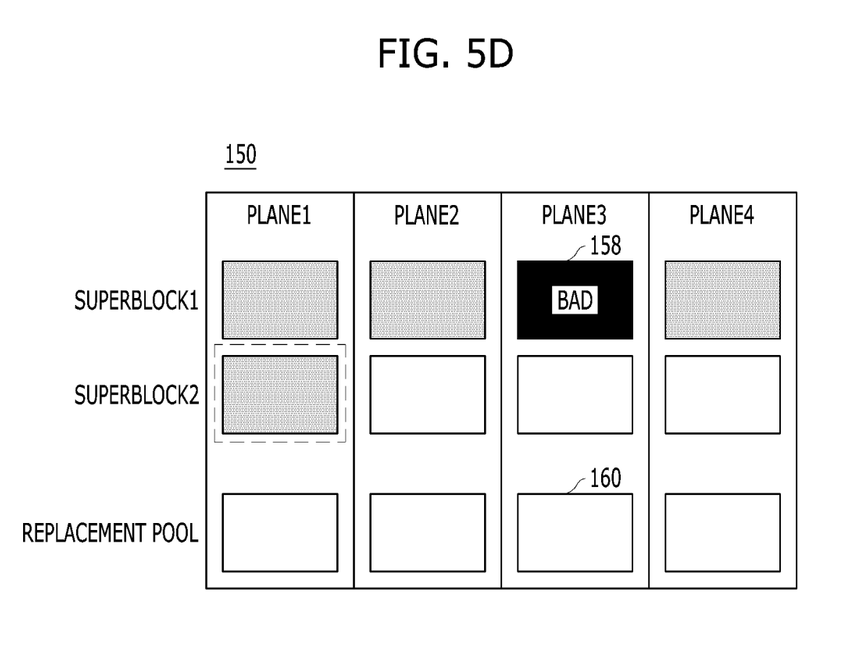

FIGS. 4 to 5D illustrate an operation of the memory system 110 in accordance with an embodiment of the present invention.

FIG. 4 is a flowchart illustrating an operation of the memory system 110. FIGS. 5A to 5D illustrate some memory blocks of the planes of the memory device 150.

Referring to FIG. 4, in step S402, the superblock manager 202 may form a reproduced superblock by replacing a bad block with a replacement block.

In the example of FIGS. 5A to 5D, it is assumed that the controller 130 uses the first superblock SUPERBLOCK1 to store data. The superblock manager 202 may determine whether or notSUPERBLOCK1 includes a bad block by referring to the superblock information 208. SUPERBLOCK1 may include a first bad block 158 in PLANE3, as shown in FIGS. 5A to 5D. In FIGS. 5B to 5D, the shaded memory blocks represent those in which data are stored.

The superblock manager 202 may replace the first bad block 158 with a first replacement block 160 that is currently available and belongs to PLANE3 within the replacement block pool 154, as indicated by the replacement block information 210. FIG. 5A illustrates a first reproduced superblock 156 that is generated by the superblock manager 202 by replacing the first bad block 158 with the first replacement block 160. The superblock manager 202 may update the replacement block information 210 to reflect that the first replacement block 160 replaces the first bad block 158 in the first reproduced superblock 156.

In step S404, the command scheduler 204 may provide program commands to the plurality of planes, i.e., PLANE1 to PLANE4, so as to program data to a reproduced superblock according to an interleaving scheme.

FIG. 5B illustrates a state in which a program operation is completed in the first reproduced superblock 156 including the first replacement block 160. In the example of FIG. 5B, the memory system 110 may maximize the parallel processing performance of a program operation even though SUPERBLOCK1 includes the bad block 158 by forming the first reproduced superblock 156 and performing the program operation on the first reproduced superblock 156.

In step S406, the background operation controller 206 may move the data from the replacement block to a pseudo-replacement block. For example, the background operation controller 206 may control the memory device 150 to program the data from the replacement block into one or more pseudo-replacement blocks and erase the replacement block.

In the example of FIG. 5C, the background operation controller 206 may configure a superblock, e.g., SUPERBLOCK2, to include a plurality of pseudo-replacement blocks. The data from the first replacement block 160 may be moved to pseudo-replacement blocks withinSUPERBLOCK2. The operation of step S406 may be performed in an idle state of the memory device 150, or may be performed when there are not enough replacement blocks to form a reproduced superblock.

In the example of FIG. 5D, the background operation controller 206 may determine one memory block as a pseudo-replacement block. The background operation controller 206 may determine a memory block in a plane which is different from a plane including the bad block and the replacement block as a pseudo-replacement block. The data from the first replacement block 160 may be moved to a memory block of PLANE1 among the memory blocks of SUPERBLOCK2.

In step S408, the superblock manager 202 may release the replacement block 160 from the reproduced superblock and returned to replacement block pool 154.

In the example of FIGS. 5C and 5D, in releasing the replacement block 160, the superblock manager 202 may update the replacement block information 210 to reflect that the first replacement block 160 no longer replaces any bad blocks. After being released and returned to the replacement block pool 154, the first replacement block 160 may be used later to replace a bad block of another superblock.

As described above, the superblock manager 202 may temporarily form a reproduced superblock by using a replacement block when programming data into a superblock including a bad block, and may release the replacement block when the program is completed. Therefore, the superblock manager 202 may improve programming performance by selectively replacing only bad blocks of target superblock; thus, such selective replacement may be done with only a few replacement blocks.

When the superblock manager 202 replaces bad blocks as described above, more memory blocks may be saved and used (or be available for) other purposes. Even when the superblock manager 202 uses only a few replacement blocks, the parallel processing performance may be maximized during the program operation of the reproduced superblock. The saved memory block(s) may be used, for example, in the overprovisioning area. When the overprovisioning area is sufficient, the background operation performance of the memory system 110 may be improved. Therefore, according to an embodiment of the present invention, the performance of a foreground operation and a background operation of the memory system 110 may be improved.

According to embodiments of the present invention, a controller and operation method thereof may improve the performance of a program operation by reproducing a superblock in a memory device with fewer replacement blocks.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A method for operating a controller that controls a memory device, the method comprising:
    replacing a bad block of a superblock with a replacement block to form a reproduced superblock;
    controlling the memory device to perform a program operation on the reproduced superblock according to an interleaving scheme;
    moving data stored in the replacement block to a pseudo-replacement block when the program operation on the reproduced superblock is completed; and
    releasing the replacement block from the reproduced superblock,
    wherein the controlling includes:
        mapping logical addresses provided along with an external request to physical addresses of memory blocks forming the reproduced superblock; and
        providing program commands and data to the memory blocks forming the reproduced superblock.

2. The method of claim 1, wherein the moving includes:
    controlling the memory device to program the data stored in the replacement block to the pseudo-replacement block; and
    controlling the memory device to erase the replacement block.

3. The method of claim 1, wherein the moving is performed as a background operation.

4. The method of claim 3, further comprising:
    detecting an idle state of the memory device,
    wherein the moving is performed based on a result of the detecting.

5. The method of claim 3, further comprising:
    identifying the replacement block for replacing the bad block from among multiple candidate replacement blocks,
    wherein the moving of the data stored in the replacement block to the pseudo-replacement block which is different from the replacement block is performed based on the identifying.

6. The method of claim 5, wherein the identifying includes:
    determining whether the identified replacement block is of the same plane as the bad block.

7. The method of claim 1, wherein the replacement block and the pseudo-replacement block belong to different planes.

8. A controller for controlling a memory device, the controller comprising:
    a processor that includes:
        a superblock manager suitable for replacing a bad block of a superblock with a replacement block to form a reproduced superblock;
        a command scheduler suitable for controlling the memory device to perform a program operation on the reproduced superblock according to an interleaving scheme; and
        a background operation controller suitable for moving data stored in the replacement block to a pseudo-replacement block when the program operation on the reproduced superblock is completed,
    wherein the superblock manager releases the replacement block from the reproduced superblock, and
    wherein the command scheduler controls the memory device to perform the program operation on the reproduced superblock according to the interleaving scheme by mapping logical addresses provided along with an external request to physical addresses of memory blocks forming the reproduced superblock and providing program commands and data to the memory blocks forming the reproduced superblock.

9. The controller of claim 8, wherein the background operation controller moves the data stored in the replacement block to the pseudo-replacement block by controlling the memory device to program the data stored in the replacement block to the pseudo-replacement block and to erase the replacement block.

10. The controller of claim 8, wherein the background operation controller moves the data stored in the replacement block to the pseudo-replacement block based on a result of detecting an idle state of the memory device.

11. The controller of claim 8,
    wherein the superblock manager is further suitable for identifying the replacement block from among multiple candidate reserve blocks, and
    wherein the background operation controller moves the data stored in the replacement block to the pseudo-replacement block based on a result of the identifying.

12. The controller of claim 11, wherein the superblock manager determines whether the replacement block is of the same plane as the bad block.

13. The controller of claim 8, further comprising:
    a memory suitable for storing superblock information and replacement block information.

14. The controller of claim 13, wherein the superblock manager forms the reproduced superblock by determining whether or not the superblock includes a bad block based on the superblock information, detecting the replacement block in the replacement block pool, and replacing the bad block with the replacement block.

15. The controller of claim 8, wherein the replacement block and the pseudo-replacement block are of different planes.

* * * * *